Patented Nov. 10, 1942

2,301,518

UNITED STATES PATENT OFFICE 2,301,518

9-FLUORENE-β-BUTYRONITRILE AND METHOD FOR ITS PREPARATION

Herman A. Bruson, Philadelphia, Pa., assignor to The Resinous Products & Chemical Company, Philadelphia, Pa., a corporation of Delaware No Drawing. Application November 12, 1941, Serial No. 418,855

4 Claims. (Cl. 260—465)

This invention relates to 9-fluorene-β-butyronitrile

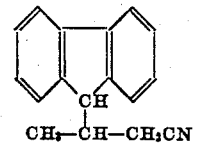

and a method for its preparation.

According to this invention, 9-fluorene-β-butyronitrile is prepared by condensing fluorene in the presence of an alkaline condensing agent with a member of the group consisting of allyl cyanide and crotononitrile.

Among the alkaline condensing agents which can be used for promoting the reaction are the oxides, hydroxides, hydrides, amides, and alcoholates of the alkali metals, or the alkali metals themselves. There may also be used strongly basic non-metallic hydroxides, such as the quaternary ammonium hydroxides. Of these, a particularly effective product is the aqueous solution containing 40% of trimethyl benzyl ammonium hydroxide which is commercially available under the trade name "Triton B." The quantity of alkaline condensing agent required is relatively small, amounts of the order of 1% to 10% on the combined weight of the reactants being sufficient. One or several of the alkaline condensing agents are suspended, or preferably dissolved, in a solution of the fluorene in an inert solvent, such as dioxane, benzene, or ether, and the crotononitrile or allyl cyanide gradually added thereto. The reaction takes place readily at temperatures between 0° and 80° C. It is conveniently started at room temperature and may be accelerated or completed by warming gently after the initial exothermal reaction has ceased.

The following example illustrates this invention, it being understood that alkalies, such as tetramethyl ammonium hydroxide, dimethyl dibenzyl ammonium hydroxide, sodium ter-butylate, sodium methylate, and the like, can be used in place of the preferred trimethyl benzyl ammonium hydroxide described below:

To a stirred solution of 83 grams of fluorene, 250 grams of dioxane, and 10 grams of aqueous 40% trimethyl benzyl ammonium hydroxide, there was added dropwise 67 grams of allyl cyanide during the course of one hour while the exothermal reaction was maintained at 38–47° C. by intermittent cooling. The mixture was then heated at 45–50° C. for six hours longer, cooled, rendered faintly acid to Congo red indicator with dilute hydrochloric acid, taken up in its own volume of ethylene dichloride and washed thoroughly with water. The ethylene dichloride layer was evaporated to dryness and the residual dark oil distilled under reduced pressure. After a small forerun of unchanged fluorene, the main fraction boiled between 190° and 220° C./1–2 mm. and weighed about 60 grams. It formed a yellow balsam which gradually solidified to a crystalline mass. Upon recrystallization from methanol, the pure product was obtained in colorless crystals melting at 92–93° C., having the analysis $C_{17}H_{15}N$, corresponding to 9-fluorene-β-butyronitrile.

In place of allyl cyanide, one can employ crotononitrile in the same manner.

9-fluorene-β-butyronitrile is useful as an intermediate for preparing drugs, plasticizers, and resins. Upon hydrolysis, it yields the corresponding 9-fluorene-β-butyramide or 9-fluorene-β-butyric acid which may function as plant growth hormones for accelerating sprouting and rooting of plants.

I claim:

1. As a new compound, 9-fluorene-β-butyronitrile having the formula:

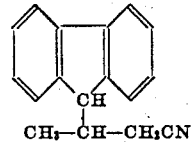

2. A method for preparing 9-fluorene-β-butyronitrile which comprises condensing fluorene in the presence of an alkaline condensing agent with a member of the group consisting of allyl cyanide and crotononitrile.

3. A method for preparing 9-fluorene-β-butyronitrile which comprises condensing fluorene in the presence of trimethyl benzyl ammonium hydroxide with a member of the group consisting of allyl cyanide and crotononitrile.

4. A method for preparing 9-fluorene-β-butyronitrile which comprises condensing fluorene in the presence of an alkaline condensing agent with allyl cyanide.

HERMAN A. BRUSON.